(12) United States Patent
Alston et al.

(10) Patent No.: US 7,615,896 B2
(45) Date of Patent: Nov. 10, 2009

(54) INTEGRATED PERMANENT MAGNET MOTOR AND BLOWER

(75) Inventors: G. Kevin Alston, Oakland, CA (US); Machiko Taylor, Alameda, CA (US)

(73) Assignee: Glacier Bay, Inc., Union City, CA (US)

( * ) Notice: Subject to any disclaimer, the term of this patent is extended or adjusted under 35 U.S.C. 154(b) by 0 days.

(21) Appl. No.: 11/588,243

(22) Filed: Oct. 27, 2006

(65) Prior Publication Data

US 2008/0100165 A1 May 1, 2008

(51) Int. Cl.
H02K 9/00 (2006.01)
(52) U.S. Cl. .................. 310/62; 310/63; 310/156.19
(58) Field of Classification Search ........... 310/156.19, 310/156.22, 156.01, 156.37, 62–63
See application file for complete search history.

(56) References Cited

U.S. PATENT DOCUMENTS

| 4,654,551 | A | * | 3/1987 | Farr ........................... 310/112 |
|---|---|---|---|---|
| 4,758,751 | A | * | 7/1988 | Hosoya et al. ................ 310/41 |
| 5,591,017 | A | | 1/1997 | Dwyer |
| 6,132,182 | A | | 10/2000 | Khan et al. |
| 6,246,133 | B1 | * | 6/2001 | Embree et al. ................ 310/47 |
| 6,351,102 | B1 | * | 2/2002 | Troy ........................... 320/139 |
| RE37,576 | E | * | 3/2002 | Stephens et al. ............. 310/254 |
| 6,488,475 | B2 | * | 12/2002 | Murata et al. ................. 417/32 |
| 6,867,527 | B2 | * | 3/2005 | Moore .......................... 310/211 |
| 6,911,756 | B1 | * | 6/2005 | Chang ..................... 310/156.01 |
| 6,940,200 | B2 | * | 9/2005 | Lopatinsky et al. ......... 310/178 |
| 2005/0046294 | A1 | * | 3/2005 | Rinholm et al. ......... 310/156.22 |
| 2005/0110356 | A1 | * | 5/2005 | Imamura et al. ......... 310/156.53 |
| 2005/0140233 | A1 | * | 6/2005 | Kojima et al. ........... 310/156.37 |
| 2005/0184611 | A1 | * | 8/2005 | Rinholm et al. ......... 310/156.21 |
| 2006/0017342 | A1 | * | 1/2006 | Park ....................... 310/156.19 |
| 2006/0138894 | A1 | * | 6/2006 | Harada et al. .............. 310/217 |

* cited by examiner

*Primary Examiner*—Thanh Lam
(74) *Attorney, Agent, or Firm*—Foley & Lardner LLP

(57) ABSTRACT

An integrated blower and motor is provided. The integrated blower and motor can include a rotor and a stator, wherein the rotor is disposed with a central bore of the stator. The integrated blower and motor includes a fan, wherein the fan can be attached to the rotor. According to the embodiments described herein, an integrated blower and motor is provided that is compact and uses less space.

16 Claims, 5 Drawing Sheets

US 7,615,896 B2

INTEGRATED PERMANENT MAGNET MOTOR AND BLOWER

The present invention relates to an integrated motor and blower. According to an embodiment, an integrated permanent magnet motor and blower is provided.

BACKGROUND

Conventional motorized blowers use an arrangement with a central shaft that supports a fan assembly. The motor includes a stator that is attached to the central shaft and an outer rotor that is attached to the fan assembly. The stator is disposed within a central bore of the rotor so that the stator is disposed in an inward radial direction in relation to the rotor, with the rotor and stator being disposed concentrically in relation to one another.

U.S. Pat. No. 5,591,017 discloses a motorized impeller assembly with a motor mounting base 11, motor shaft 16, stator member 12, rotor member 14, and rotating impeller member 15. The motor shaft 16 fits within the motor mounting base 11 and the stator member 12 engages the motor mounting base 11. The rotor member 14 is integrated and fixed with the impeller 15 so that the rotor member 14 and impeller 15 may freely rotate on the shaft 16.

U.S. Pat. No. 6,132,132 discloses a fan subassembly 22 that is mounted to and supported by an elongate main mounting member 30. A stator 34 is secured to the main mounting member 30. The fan subassembly 22 includes a rotor 40 and is mounted to the main mounting member 30 so that the fan subassembly 22 is rotatable relative to the main mounting member 30. The stator 34 is located within the bore of the rotor and is concentric with respect to the rotor 40.

BRIEF DESCRIPTION OF THE DRAWINGS

These and other features, aspects, and advantages will become apparent from the following description, appended claims, and the accompanying exemplary embodiments shown in the drawings, which are briefly described below.

DETAILED DESCRIPTION

Embodiments will be described below with reference to the drawings.

Conventional blower arrangements in which the stator is arranged in an inner radial direction in relation to the rotor are relatively large and require an unnecessary amount of space.

An object of the embodiments described herein is to provide an integrated motor and blower. Such an integrated motor and blower can be used in midsize air conditioning units, such as those used in, for example, trucks, boats, and other transportation units.

A further object of the embodiments described herein is to provide an integrated motor and blower that requires less space. An integrated motor and blower can be used to provide fluid flow, such as the movement of air.

Figures 1, 2:
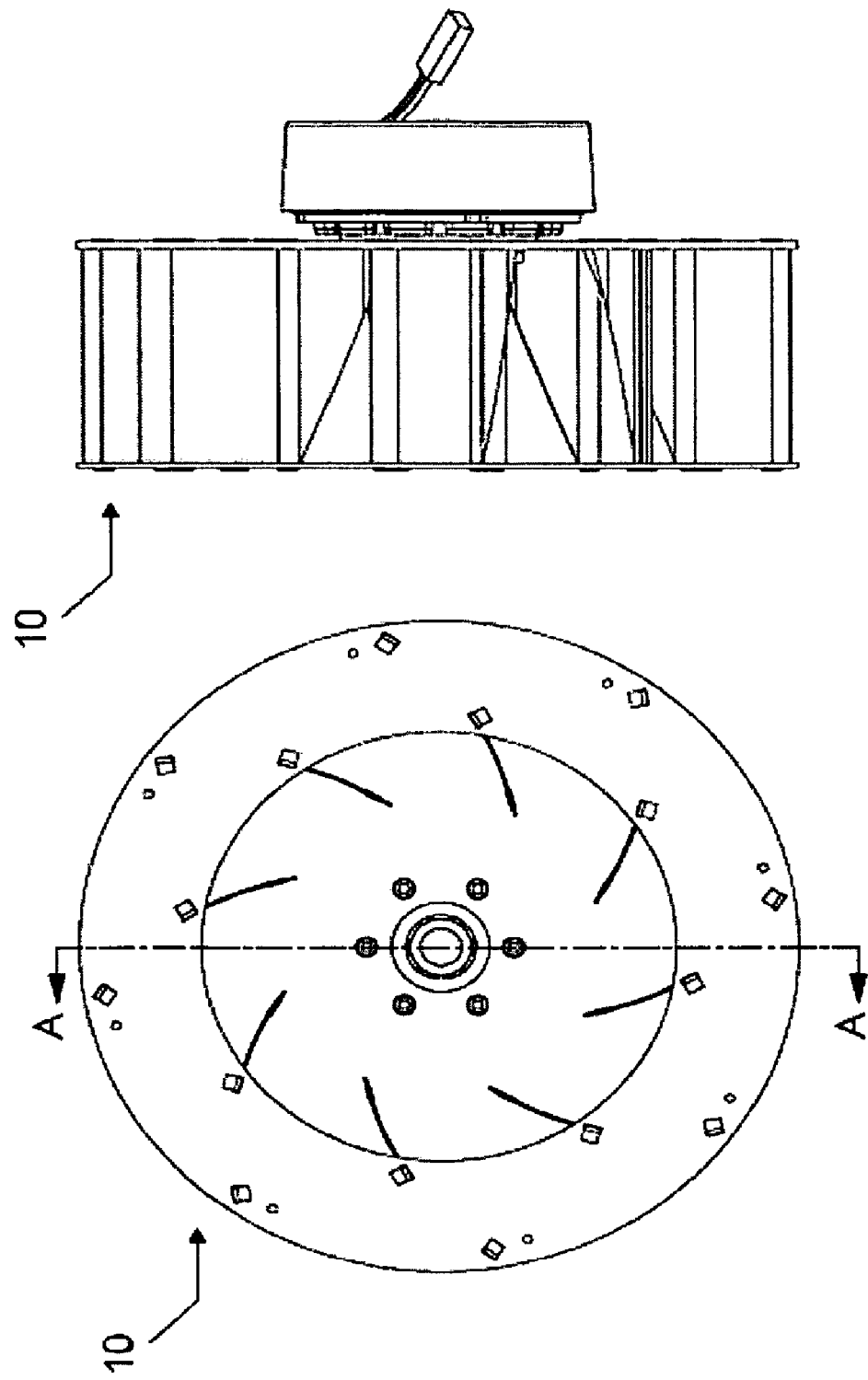
FIG. 1 is a plan view of a fan assembly, according to an embodiment.
FIG. 2 is a side view of a fan assembly, according to an embodiment.
Figure 3:
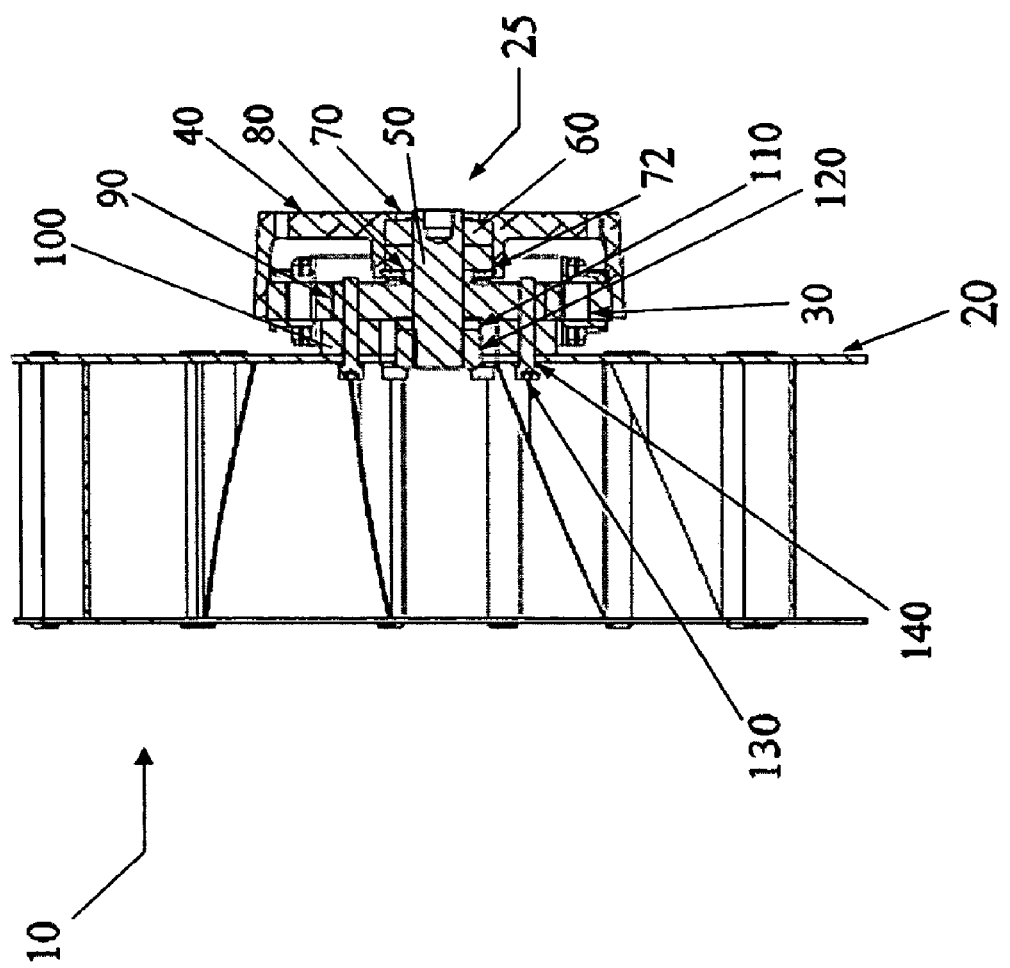
FIG. 3 is a sectional view along line A-A in FIG. 1.

FIG. 1 shows a plan view of a blower, according to an embodiment. FIG. 2 shows a side view of a blower and FIG. 3 illustrates a sectional view along line A-A in FIG. 1.

A blower 10 is shown in FIG. 1 and a side view of a blower is shown in FIG. 2, according to an embodiment. As shown in the sectional view of FIG. 3, the blower 10 can include a fan 20 and motor 25 integrated with one another.

The motor 25 includes a stator 30, which can be provided and attached to the motor case 40 so that the stator 30 is integrated with the motor case 40. A shaft 50 can be provided in a central portion of the motor case 40, with the shaft extending through a central bore of the stator 30. A shaft 50 can be connected to a fan 20, such as to provide rotational movement of the fan.

A bearing 60 can be provided to rotatably support the shaft 50 in relation to the motor case 40. The bearing 60 can be arranged at an end of the shaft 50. For example, the bearing 60 can be arranged at the end of the shaft 50 to support the shaft 50 within the motor housing 40, as shown in the example of FIG. 3. Retaining rings 70, 72, flanges, or other devices known in the art can be utilized to hold the bearing 60 in position within the motor case 40. A spacer 80, washer, or other device known in the art can also be provided to abut and position the bearing 60 within the motor case 40.

The motor 25 further includes a rotor 90, which is disposed within a central bore of the stator 30. The rotor 90 and stator 30 can be positioned so that they are concentric to one another. According to an embodiment, the rotor 90 is disposed closer to the shaft 50 than the stator 30 so that the rotor 90 is positioned internally to the stator 30. According to an embodiment, the shaft 50 is disposed within a central bore of the rotor 90, and the rotor 90 is disposed within a central bore of the stator 30.

The rotor 90 can be positioned in relation to the fan 20 by a spacer 100, washer, or other device known in the art that can be disposed between the rotor 90 and the fan 20. Screws 130, bolts, or other fastening devices known in the art can be used to join the rotor 90 to the fan 20. The spacer 100 can be fixed between the fan 20 and the rotor 90, as shown in the example of FIG. 3.

According to an embodiment, the rotor 90 is directly attached to the fan 20. As shown in the example of FIG. 3, the rotor 90 can be attached to the fan 20 by a spacer 100 and screws 130 or other devices known in the art. By using an arrangement in which the fan is attached to the rotor, an integrated blower and motor can be provided that uses less space. Furthermore, this arrangement advantageously permits the fan to conduct heat from the motor, thereby improving the thermal management of the motor. According to a further embodiment, the fan 20 is not directly attached to the shaft 50.

The shaft 50 can be positioned in relation to the fan 20 by providing a nut 120 or other device known in the art. A lock washer 110, spacer, or other device known in the art may also be provided to position the nut 120, rotor 90, and shaft 50 in relation to one another.

According to an embodiment, the rotor 90 can be fixed to the shaft 50 so that the shaft 50 also turns when the rotor 90 is turned by the function of the motor 25. According to another embodiment, the rotor 90 can be rotatably supported by the shaft 50 so that the rotor 90 turns freely upon the shaft 50.

Figure 7:
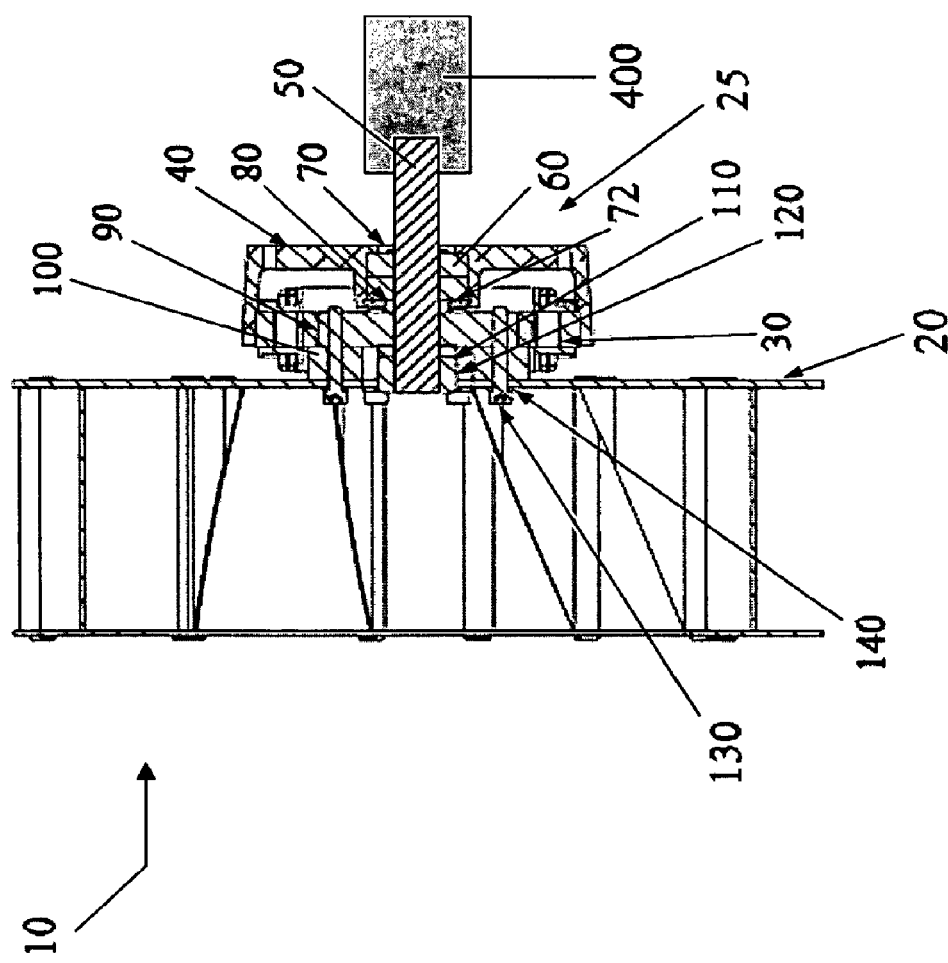
FIG. 7 is a sectional view of a fan assembly, according to an embodiment.

According to an embodiment, a shaft can be configured to extend outward from a surface of a motor. The shaft can be configured to extend outward from a surface of a motor in a direction that is opposite of a blower fan. In the example shown in FIG. 7, a shaft 50 can extend outward so that the shaft 50 extends from a motor 25 to a second device 400 that is driven by the shaft 50 and motor 25. Configuring a shaft to extend from a motor permits a motor to drive another device in addition to a blower fan, such as, for example, a second shaft-mounted blower fan, a pump, a gear drive, or other shaft-driven devices known in the art.

The function of an integrated blower and motor will now be described in relation to the example shown in FIG. 3. The motor 25 is activated by energizing the stator 30, which generates a field that couples with the rotor 90, causing the rotor 90 to turn within the stator 30. Because the fan 20 is attached to the rotor 90, the fan 20 also turns as the rotor 90 rotates, causing the blower 10 to generate a forced air stream.

According to a further embodiment, an integrated blower and motor is provided that includes a fan 20 and a motor 25. The motor includes a stator 30 and a rotor 90, wherein the rotor 90 includes permanent magnets retained within the rotor 90.

Figure 4:
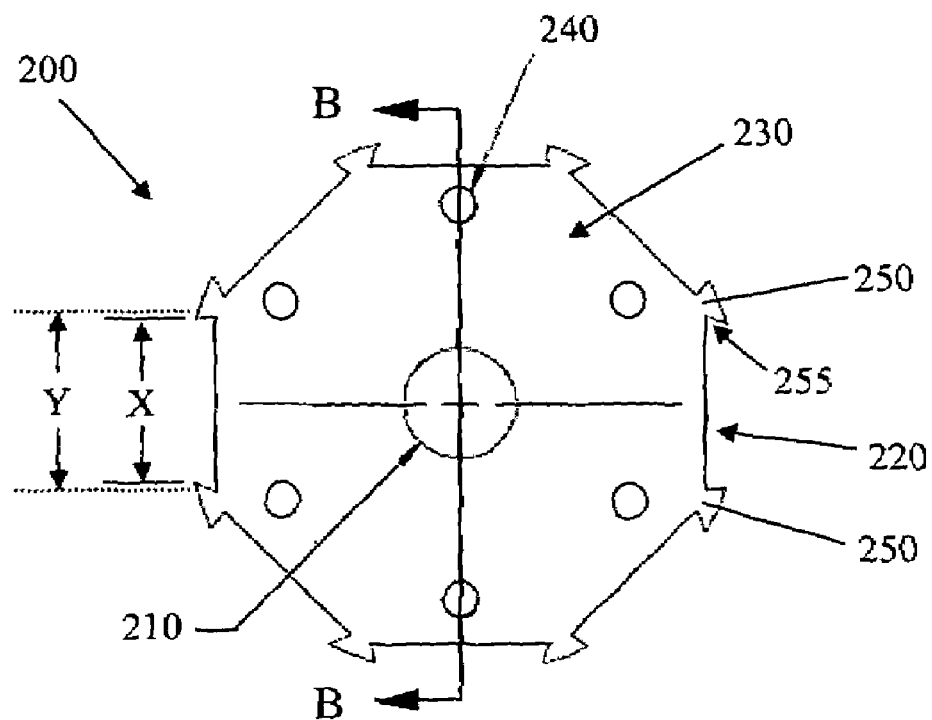
FIG. 4 is a top view of a rotor, according to an embodiment.

FIG. 4 shows a top view of a rotor 200, according to an embodiment. The rotor 200 includes a rotor body 230 that can include a central bore 210 that can be configured to engage with a shaft, such as the shaft 50 shown in the example of FIG. 3.

Figure 5:
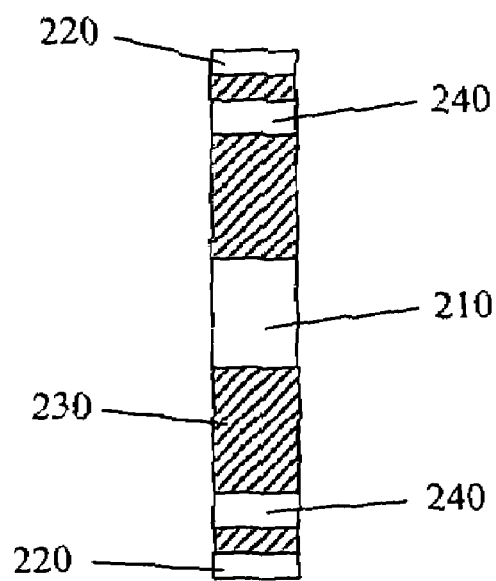
FIG. 5 is a cross-sectional view along line B-B in FIG. 4.

According to a further embodiment, a rotor 200 can be formed by stacking a series of plates or laminations having the shape of the rotor. Such a stack of plates or laminations would be stacked in a direction going into the page of FIG. 4. The plates or laminations can be made of magnetically permeable material. According to this embodiment, the rotor 200 can include apertures 240 for joining the plates or laminations together, such as by, for example, welding, adhesive, caulk, or other joining methods known in the art. FIG. 5 shows a cross-sectional view of a rotor 200 along line B-B of FIG. 4.

According to an embodiment, a rotor 200 can include a plurality of recesses 220 for retaining permanent magnets in the rotor 200. As shown in the example of FIG. 4, recesses can be arranged along an outer circumferential edge of a rotor 200.

A rotor 200 can include retention structures 250 for retaining magnets in the rotor 200. Such retention structures are designed to maintain retention of magnets within a rotor during high rotational speeds and at high temperatures that cause thermal expansion of rotor parts.

According to a further embodiment, the retention structures 250 can include angled surfaces 255 that are designed to form angles so that the outer radial opening of a recess 220 has a smaller width X than the width Y of the base of the recess 220, as shown in the example of FIG. 4. Such a recess arrangement enhances retention of permanent magnets within the recesses during use of a rotor.

Figure 6:
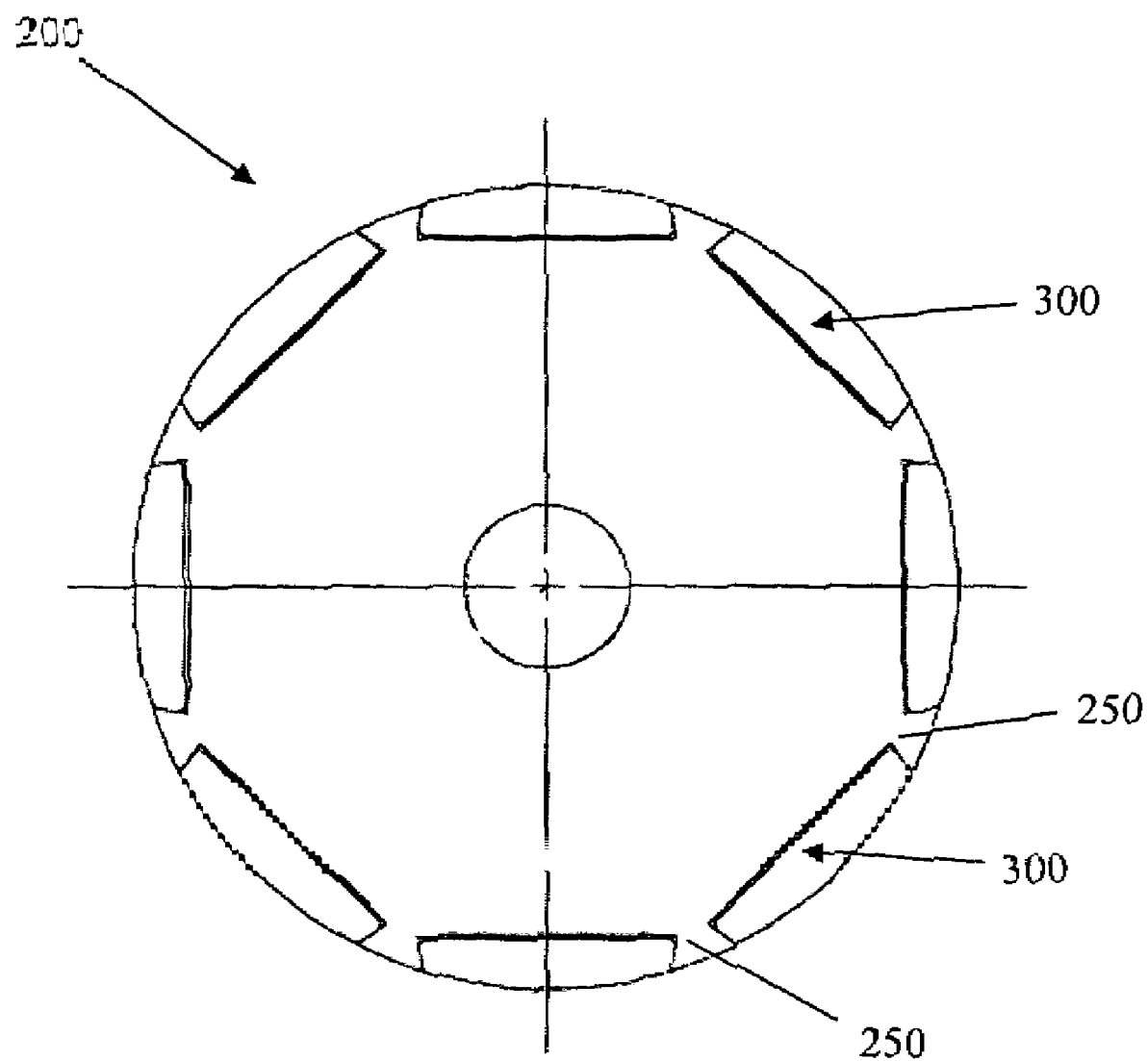
FIG. 6 is a top view of a rotor, according to an embodiment.

FIG. 6 shows a top view of a rotor embodiment in which permanent magnets 300 have been inserted in recesses 220 of a rotor 200. As shown in the example of FIG. 6, permanent magnets 300 can be inserted between retention structures 250 to aid in the retention of the permanent magnets 300 during use of a rotor 200. To further ensure retention of magnets within the rotor, an adhesive, such as an epoxy, may be used to attach magnets to a rotor. For example, an adhesive may be applied within recesses 220 between the magnets 300 and the rotor body 230 so that adhesives fills all gaps between the magnets and the rotor body. Such an adhesive would preferably be strong enough to withstand the rotational forces occurring during use of the rotor and would not degrade with time or temperature during use of the rotor.

Given the present disclosure, one versed in the art would appreciate that there may be other embodiments and modifications within the scope and spirit of the invention. Accordingly, all modifications attainable by one versed in the art from the present disclosure within the scope and spirit of the present invention are to be included as further embodiments. For example, the arrangement shown in the example of FIG. 3 is not meant to be limiting and other configurations and arrangements are considered to be included as further embodiments.

What is claimed is:

1. A blower assembly, comprising:
   a fan;
   a permanent magnet motor comprising a stator and a rotor, wherein the rotor is disposed within a central bore of the stator; and
   a shaft, wherein the shaft is arranged within a central bore of the rotor;
   wherein the fan is configured to be driven by the rotor;
   wherein the fan is directly attached to the rotor by a connection that is offset in a lateral direction from the central bore of the rotor.

2. A blower assembly, comprising:
   a fan;
   a permanent magnet motor comprising a stator and a rotor, wherein the rotor is disposed within a central bore of the stator; and
   a spacer that directly attaches the fan to the rotor, wherein one surface of the spacer is in direct contact with an axial face of the rotor and an opposite axial surface of the spacer is in contact with an axial face of the fan;
   wherein the rotor is configured to drive the fan;
   wherein the fan is directly attached to the rotor by a connection that is offset in a lateral direction from a central bore of the rotor.

3. The blower assembly of claim 2, wherein the fan and motor are integrated.

4. The blower assembly of claim 1, wherein the rotor comprises a plurality of recesses that retain a plurality of permanent magnets.

5. The blower assembly of claim 4, wherein the plurality of recesses are arranged along an outer circumferential edge of the rotor.

6. The blower assembly of claim 4, wherein the rotor further comprises retention structures that retain the plurality of permanent magnets within the rotor.

7. The blower assembly of claim 6, wherein the retention structures form angled surfaces so that a width of an outer radial opening of a recess is smaller than a width of a base of the recess.

8. The blower assembly of claim 1, wherein the shaft is configured to extend outward from a surface of the motor in a direction opposite to the fan.

9. The blower assembly of claim 8, wherein the shaft is configured to drive a second fan, pump, or gear drive in addition to the fan.

10. The blower assembly of claim 2,
    wherein the rotor comprises a plurality of recesses that retain a plurality of permanent magnets;
    wherein the rotor further comprises retention structures that retain the plurality of permanent magnets within the rotor, wherein the retention structures form angled surfaces so that a width of an outer radial opening of a recess is smaller than a width of a base of the recess.

11. The blower assembly of claim 2, further comprising a shaft, wherein the shaft is arranged within the central bore of the rotor;
    wherein the fan is not directly attached to the shaft.

12. The blower assembly of claim 1, wherein the offset attachment is formed by at least one fastener.

13. The blower assembly of claim 2, wherein the spacer is disc-shaped.

14. The blower assembly of claim 2, wherein the spacer is configured to conduct heat from the motor to the fan.

15. A blower assembly, comprising:

a fan;

a permanent magnet motor comprising a stator and a rotor, wherein the rotor is disposed within a central bore of the stator, wherein the rotor is configured to drive the fan; and a spacer that directly attaches the fan to the rotor, wherein one surface of the spacer is in direct contact with an axial face of the rotor and an opposite axial surface of the spacer is in contact with an axial face of the fan;

wherein the fan is directly attached to the rotor by the spacer and a connection that is offset in a lateral direction from a central bore of the rotor;

wherein the fan is directly attached to the rotor by a connection that is offset in a lateral direction from the central bore of the rotor.

16. The blower assembly of claim 15, wherein the spacer is configured to conduct heat from the motor to the fan.

* * * * *